(12) United States Patent
Luigi

(10) Patent No.: US 6,536,583 B2
(45) Date of Patent: Mar. 25, 2003

(54) CONVEYOR DEVICE

(76) Inventor: Reguzzi Luigi, Via San Alessandro, 139/141, 22060 Mariano Comense (Como) (IT)

( * ) Notice: Subject to any disclaimer, the term of this patent is extended or adjusted under 35 U.S.C. 154(b) by 0 days.

(21) Appl. No.: 09/827,400

(22) Filed: Apr. 6, 2001

(65) Prior Publication Data

US 2001/0045345 A1 Nov. 29, 2001

(30) Foreign Application Priority Data

May 15, 2000 (IT) .......................... MI00A1066

(51) Int. Cl.⁷ .................. B65G 23/00; B65G 23/14; B65G 15/54; B65G 17/38; B65G 17/06
(52) U.S. Cl. .................. 198/832; 198/833; 198/849; 198/850
(58) Field of Search ................. 198/832, 833, 198/835, 849, 850, 834

(56) References Cited

U.S. PATENT DOCUMENTS

| 5,174,437 A | * | 12/1992 | Burger ..................... 198/833 |
| 5,303,817 A | * | 4/1994 | Kissee ..................... 198/833 |
| 5,394,978 A | * | 3/1995 | Majewski et al. .......... 198/831 |
| 5,415,274 A | * | 5/1995 | Krismanth et al. ......... 198/833 |
| 6,006,898 A | * | 12/1999 | Odink ..................... 198/833 |
| 6,161,685 A | * | 12/2000 | Stebnicki .................. 198/851 |
| 6,244,426 B1 | * | 6/2001 | Murano et al. ............ 198/784 |
| 6,322,467 B1 | * | 11/2001 | Hook et al. ............... 198/833 |

* cited by examiner

Primary Examiner—Joseph E. Valenza
Assistant Examiner—Gene O. Crawford
(74) Attorney, Agent, or Firm—Hedman & Costigan, P.C.

(57) ABSTRACT

A conveyor device comprises a conveyor belt including a plurality of slidable links which can slide on guiding elements. The conveyor belt is driven by a timing belt through link teeth formed on each of the links, and designed for engaging corresponding teeth of the timing belt.

6 Claims, 4 Drawing Sheets

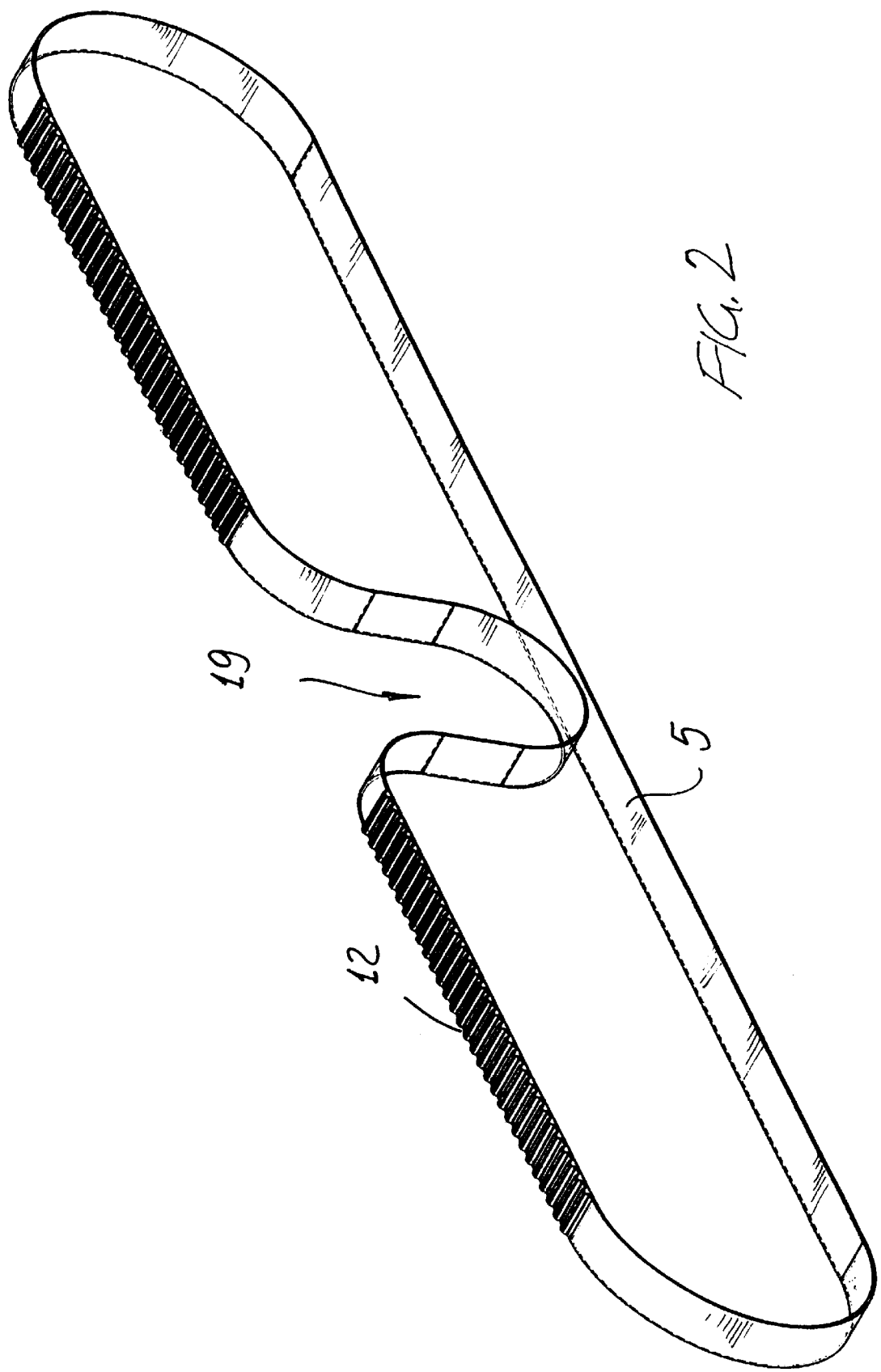

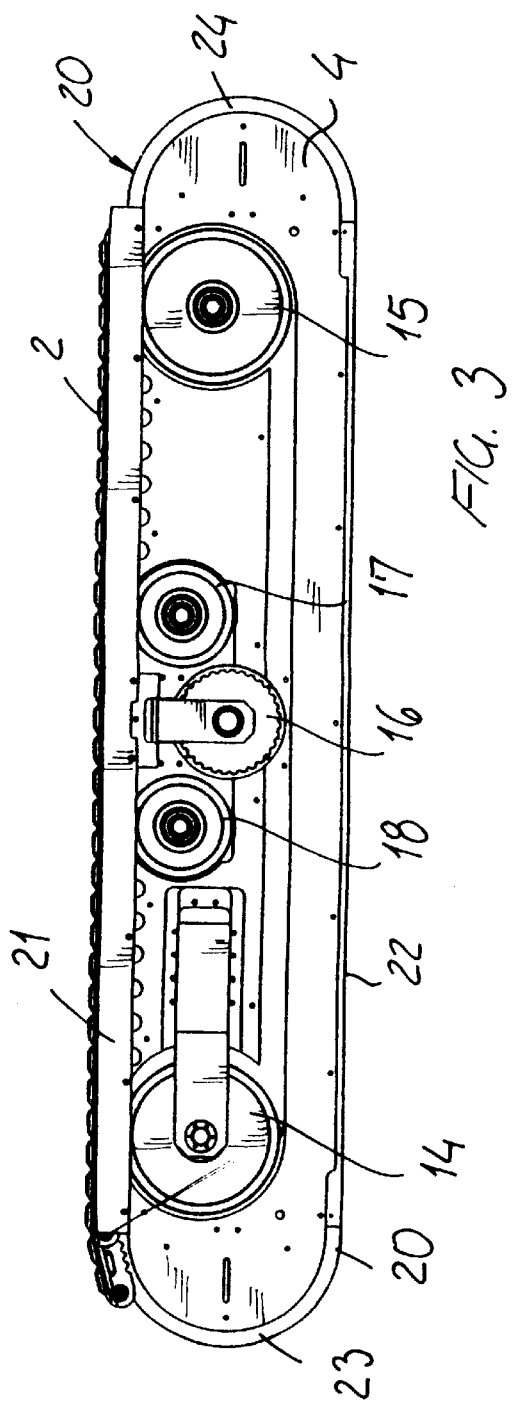
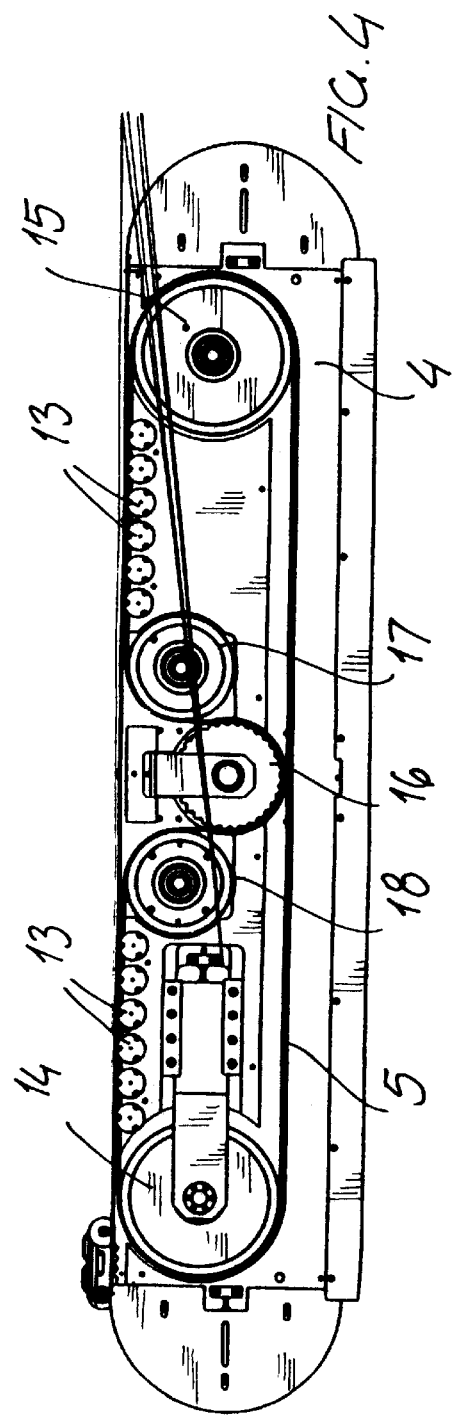

CONVEYOR DEVICE

BACKGROUND OF THE INVENTION

The present invention relates to a conveyor device.

More specifically, the present invention relates to a precision conveyor device, driven by a step motor, either of a DC type or of a brushless type.

Prior conveyor belts, used in precision machining operations, for example to bring workpieces to a tool machine, must locate the workpiece in a very accurate manner with respect to the machining tool.

SUMMARY OF THE INVENTION

The aim of the present invention is to provide a great precision or accuracy conveyor device.

Within the scope of the above mentioned aim, a main object of the present invention is to provide such a conveyor device which can be used both on automatized processing lines and in individual machining apparatus, requiring the workpieces to be very accurately located.

Another object of the present invention is to provide a conveyor device specifically suitable for conveying and locating movable elements, such as panels, section members or contoured elements, mechanisms, and so on.

According to one aspect of the present invention, the above mentioned aim and objects, as well as yet other objects, which will become more apparent hereinafter, are achieved by a conveyor device characterized in that said conveyor device comprises a conveyor belt, including a plurality of slidable links which can slide on guide means, and being driven by a timing belt through engagement means provided on each said link and operable to engage the teeth of the timing belt.

BRIEF DESCRIPTION OF THE DRAWINGS

Further characteristics and advantages of the present invention will become more apparent hereinafter from the following disclosure of a preferred, though not exclusive, embodiment of the invention, which is illustrated, by way of an indicative, but not limitative, example, in the accompanying drawings, where:

FIG. 2 is a perspective view of the timing belt applied to the conveyor device according to the invention, being shown in its operating condition;

FIG. 3 is a schematic side elevation view of the conveyor device according to the invention, in which a portion of the conveyor belt is shown;

FIG. 4 is a view like FIG. 3 of the conveyor device according to the invention, in which is shown in a detailed manner the timing belt therefor;

DESCRIPTION OF THE PREFERRED EMBODIMENT

Figure 1:
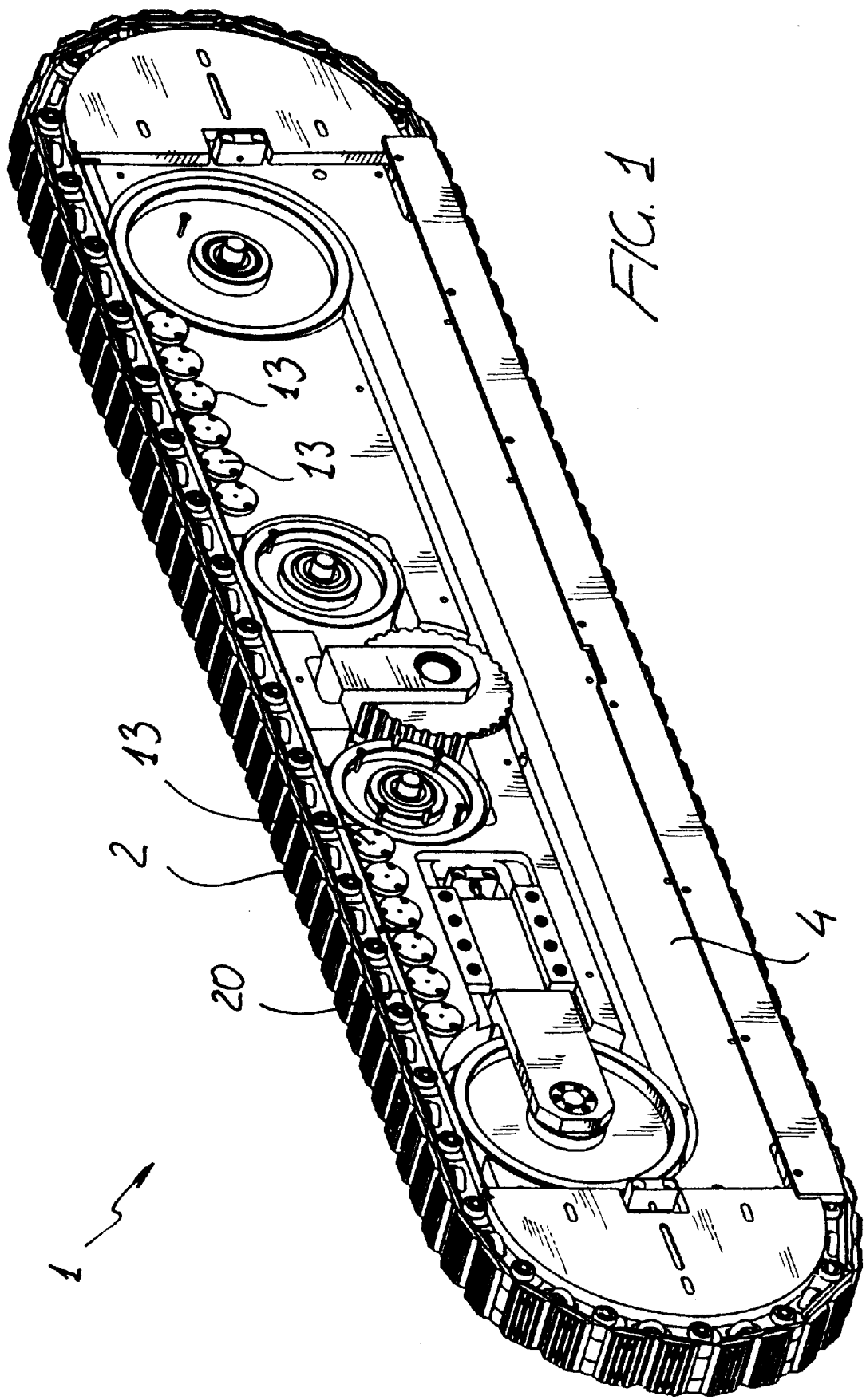
FIG. 1 is a perspective view of the conveyor device according to the present invention, being shown without the timing belt therefor.
Figure 5:
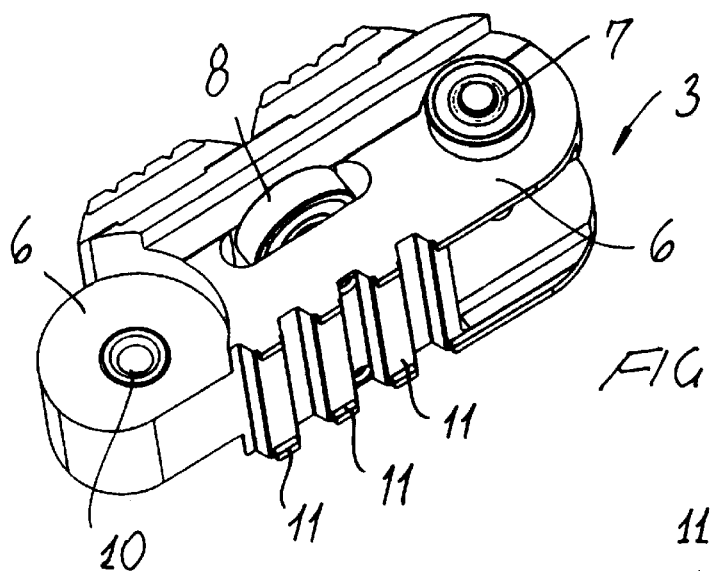
FIG. 5 is a perspective view of three quarters of a link of the conveyor belt.
Figure 6:
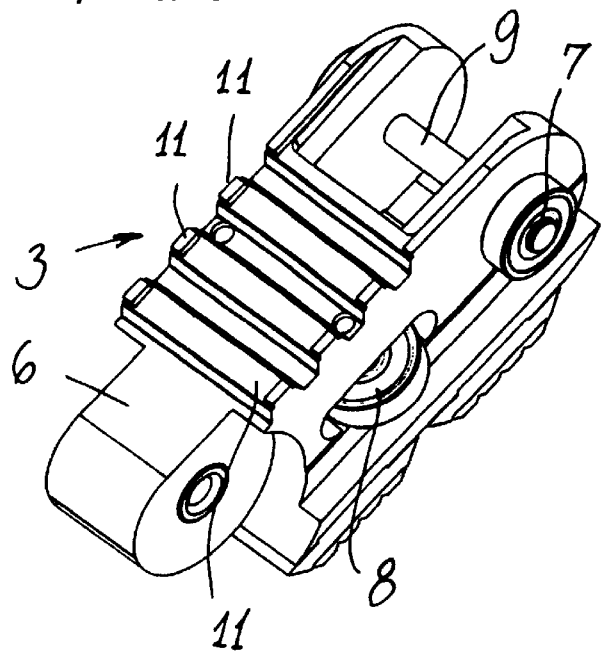
FIG. 6 is a bottom perspective view of a link of the conveyor belt.
Figure 7:
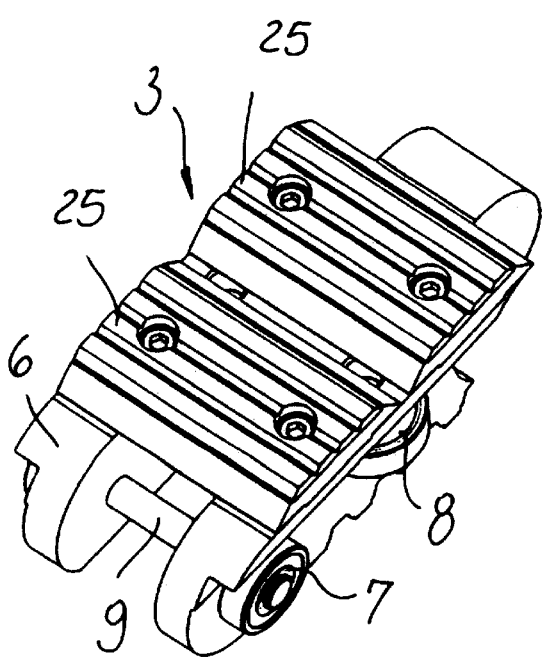
FIG. 7 is a top perspective view of a link of the conveyor belt.

With reference to the number references of the accompanying drawings, the conveyor device according to the invention, generally indicated by the reference number 1, comprises a conveyor belt 2, including a plurality of conveyor belt links 3 which can slide on guide means, comprising a frame 4, and being driven by a timing belt 5 also supported by said frame (4).

Each link 3 comprises a supporting body 6 for a first pair of sliding bearings 7 having a horizontal axis, and a second pair of side guide bearings 8, having a vertical axis.

Each link 3 is coupled to adjoining links by pivot pins 9 and corresponding rolling bush elements 10.

Each link 3 is provided, at the bottom thereof, with a plurality of teeth 11, having a configuration and depth size corresponding to the configuration and size of the teeth 12 of the timing belt 5, thereby providing engagement means designed for engaging the teeth 12 of the timing belt.

The timing belt 5 comprises a metal core, covered by reinforced plastic materials, and the teeth 12 thereof are outwardly directed.

The timing belt 5 has a general outline as clearly shown in FIG. 2.

More specifically, the timing belt 5 slides on the frame 4, while defining at least a top flat trajectory, as guided on guiding or driving rollers 13, and being controlled by two end pulleys 14 and 15, at the end portions of its path or trajectory.

At a middle region of the top flat trajectory, a toothed pulley 16 is provided, said toothed pulley being arranged at the bottom between a pair of flat pulleys 17 and 18 which, by cooperating with said pulley 16, causes the timing belt 5 to define a downward directed loop 19.

The toothed pulley 16 is driven by driving means (not specifically shown), comprising a step motor, or a DC motor, or a brushless motor, through a suitable motor reducing unit.

The number of the links 3 forming the conveyor belt 2 can be changed depending on the length of the conveyor belt, which slides along a sliding guide 20 of substantially oval shape, and extending on the periphery of the frame 4.

The guide 20 comprises two rectilinear portions, respectively a top rectilinear portion 21 and a bottom rectilinear portion 22, connected by two semicircular portions 23 and 24.

The guide 20 constitutes a track assembly, designed for engaging the guide bearings of the conveyor belt links 3, to allow the engagement means, constituted by the teeth 11 and links 3, to engage the teeth 12 of the timing belt 5 at least through the top rectilinear portion thereof.

Thus, the timing belt 5 will operatively drive the conveyor belt 2, the links 3 of which are provided with supporting elements 25 for supporting an article to be conveyed (not shown).

It has been found that the invention fully achieves the intended aim and objects.

Actually, a conveyor device has been provided, which has been specifically designed for use on automatized processing lines, or in individual machines requiring to accurately operatively locate the workpieces to be processed.

It should be apparent that the used materials, as well as the contingent shapes and size, can be any, depending on requirements and the status of the art.

What is claimed is:

1. A conveyor device comprising a conveyor belt, including a plurality of links having link teeth, said conveyor belt sliding on guide means supported by a supporting frame, said conveyor device including a timing belt slidably supported on said supporting frame and having timing belt teeth for driving said conveyor belt by engaging said link teeth with said timing belt teeth, wherein said timing belt defines an operating trajectory comprising at least a top flat portion and at least a downward directed loop at a middle position of said top flat portion.

2. A conveyor device, according to claim 1, wherein each said link comprises a supporting body including a first pair of horizontal-axis sliding bearings and a second pair of vertical-axis side guiding bearings.

3. A conveyor device, according to claim 1, in which each said link is coupled to adjoining links by pivot pins and rolling bush elements, said teeth of said links having a configuration and a depth size corresponding to a configuration and a size of said teeth of said timing belt, said teeth of said timing belt being outwardly directed, said timing belt comprises a metal core covered by reinforced plastic materials, said frame slidably supporting said timing belt having guide rollers and two end pulleys, arranged at respective end portions of said top flat trajectory, for engaging said timing belt, and having at a middle region of said top flat trajectory, a toothed pulley arranged at a bottom between a pair of flat pulleys cooperating with said toothed pulley to cause said timing belt to form a downward directed loop.

4. A conveyor device, according to claim 3, wherein said toothed pulley is driven by motor means, selected from the group consisting of a step motor, a DC motor, and a brushless motor.

5. A conveyor device, according to claim 1, wherein the number of said links forming said conveyor belt can be varied depending on a desired length of said conveyor belt, said guide means on which said conveyor belt slides comprising two rectilinear guide portions, having a top and a bottom rectilinear portions, said top and bottom rectilinear portions being connected by two semicircular guide portions, thereby forming a substantially oval shaped, peripherally arranged guide means on said frame.

6. A conveyor device, according to claim 5, wherein said guide means provide a track which engages said sliding bearings on said links.

* * * * *